United States Patent Office
3,415,781
Patented Dec. 10, 1968

3,415,781
TITANIUM PHOSPHINATE POLYMERS
Burton Peter Block, Chester County, and Gerd Helmut Dahl, King of Prussia, Pa., assignors to Pennsalt Chemicals Corporation, Philadelphia, Pa., a corporation of Pennsylvania
No Drawing. Filed July 6, 1966, Ser. No. 563,038
11 Claims. (Cl. 260—47)

ABSTRACT OF THE DISCLOSURE

A new titanium phosphinate polymer is prepared by reacting a phosphinic acid having the formula $R_1R_2P(O)OH$ where $R_1$ and $R_2$ are selected from the group consisting of alkyl and halogeno-substitued alkyl radicals having 1 to 10 carbon atoms and phenyl and substituted phenyl radicals, with a titanium chelate compound of the formula $(RO)_2TiZ$ where R is an alkyl group having from 1 to 4 carbon atoms and Z is a bidentate ligand.

---

This invention relates to new titanium phosphinate polymers derived from titanium chelate compounds. More particularly, this invention is concerned with a titanium phosphinate polymer to which the following repeating structural unit is assigned:

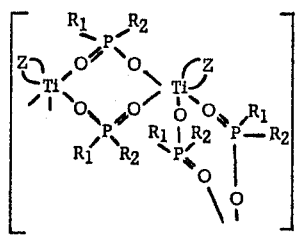

where $R_1$ and $R_2$ are selected from the group consisting of alkyl radicals and halogeno-substituted alkyl radicals having one to ten carbon atoms, phenyl radicals and mono- or multi-substituted phenyl radicals wherein the substituents on said substituted phenyl radicals are independently selected from the group consisting of the halogens and alkyl groups having one to eight carbon atoms, the halogen substituents on said above halogeno-substituted radicals being selected from the group consisting of fluorine, chlorine and bromine, and Z represents a chelating group, more specifically, a bidentate ligand with a charge of —2. Said bidentate ligand is an aromatic anion obtained by removal of the active hydrogen atoms from the hydroxy groups, or hydroxy and carboxyl groups, attached to adjacent ring carbon atoms of a six carbon atom aromatic ring or a ten carbon atom fused aromatic ring of an aromatic diol or aromatic hydroxy carboxylic acid, which aromatic rings can also be substituted in positions other than the adjacent hydroxy groups, or the adjacent hydroxy and carboxyl groups, with substituents selected from the class consisting of alkyl groups having one to four carbon atoms and the halogens, chlorine, fluorine and bromine. Said bidentate ligands (Z groups) can be represented by the structures depicted below and the same structures where one or more aromatic ring hydrogen atoms have been replaced by substituents as described above.

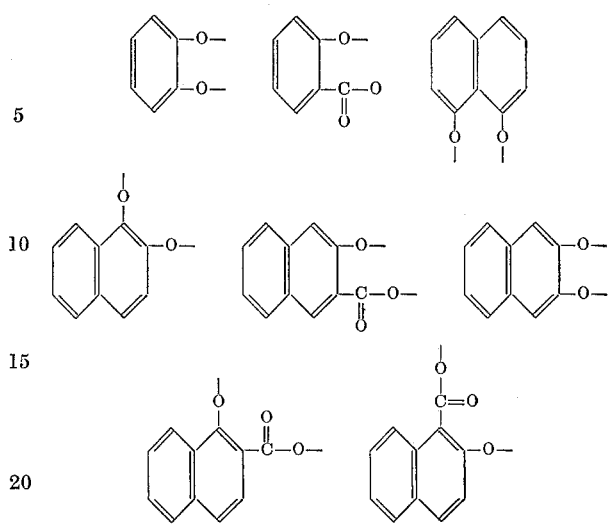

The preferred chelating (Z) groups are the following with reference made to the precursor from which the chelating group is derived:

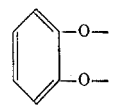

derived from catechol (o-dihydroxybenzene)

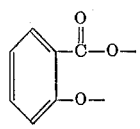

derived from salicylic acid (o-hydroxybenzoic acid).

The titanium phosphinate polymer of this invention is prepared by reacting a phosphinic acid having the formula $R_1R_2P(O)OH$, the radicals $R_1$ and $R_2$ having been defined above, with a titanium chelate compound of the formula $(RO)_2TiZ$ where R represents an alkyl group having one to four carbon atoms and Z is the bidentate ligand as defined above. The reaction is desirably carried out in a solvent such as benzene, toluene, xylene, carbon tetrachloride, dichloroethane, tetrachloroethane or chloroform using a 1:2 molar ratio of the titanium chelate to the phosphinic acid. The reaction mixture is heated in the range of about 25° C. to 140° C. for a period of about one to ten hours. The product polymer is isolated by removal of the solvent by distillation.

The titanium chelate compound, $(RO)_2TiZ$, which is, as discussed above, the starting material for the titanium phosphinate polymer of this invention, is obtained by reacting a titanium alkoxide, i.e., $Ti(OR)_4$, where R is an alkyl group having one to four carbon atoms, with a precursor of the bidentate ligand, Z. The reaction is depicted below, generally in (I), and for a specific case in (II) where the precursor of the bidentate ligand (chelating group) is catechol and the titanium alkoxide is titanium tetraethoxide.

(I) 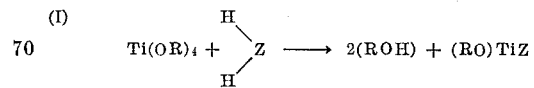

(II) 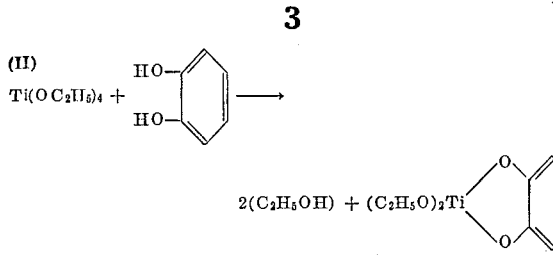

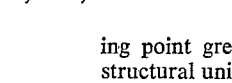

The reaction to produce the titanium chelate compound is carried out by reacting equimolar quantities of the precursor of the bidentate ligand and titanium alkoxide, preferably in the presence of a dry, inert solvent such as benzene, toluene, chloroform, or carbon tetrachloride. The reaction proceeds readily between 25° and 100° C. and is usually completed within one hour. It is desirable to carry out these reactions under nitrogen or some other inert gas to exclude moisture. After the reaction is complete, the desired product is obtained by crystallization or by removal of solvent by distillation.

The titanium phosphinate polymers embodied herein are characterized by enhanced thermal stability due to the absence of carbon to carbon bonds in the main polymer backbone. The molecular weights of the polymers will generally be in the range of about 1,500 to greater than 10,000, e.g., up to about 100,000, as determined by the well-known thermoelectric vapor pressure measurement method. The polymers, which have softening points in the range of about 170° C. to over 300° C., are useful as corrosion resistant coatings for metal surfaces exposed to salt water spray. The coatings are conveniently applied by spraying the metal substrate with a solution of the polymer in a solvent such as benzene or toluene. The solvent is evaporated at ambient or elevated temperatures to leave a film of the polymer on the metal surface.

The illustrative examples that follow serve to clarify the invention and should not be construed as limitative of the scope thereof.

EXAMPLE 1

Preparation of titanium chelate o-Dihydroxybenzene, $C_6H_4(OH)_2$ (7.0 parts, 0.0636 mole), is added to titanium isopropoxide, $Ti[OCH(CH_3)_2]_4$ (18.08 parts, 0.0636 mole), in solution in 200 ml. of benzene under an inert atmosphere of nitrogen. The reaction is carried out at reflux (about 80° C.) for one hour, during which period the benzene and by-product isopropanol are removed from the reaction mixture by vacuum distillation. The product residue is recrystallized from dry benzene to give 16.2 parts of orange yellow crystals (93% yield) identified as

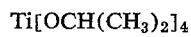

*Analysis.*—Calculated for $C_{12}H_{18}O_4Ti$: C, 52.52; H, 6.60; Ti, 17.5. Found: C, 52.80; H, 6.40; Ti, 18.1.

The orange-yellow crystals form a dark red liquid when heated to above their melting point of 112–114° C. The product is converted to a red-brown infusible solid upon prolonged exposure to air.

Preparation of titanium phosphinate polymer 5.12 parts of diphenylphosphinic acid, $(C_6H_5)_2P(O)OH$ is added with stirring to 3.22 parts of the above-described titanium chelate, $(o-C_6H_4O_2)-Ti[OCH(CH_3)_2]_2$, in benzene solution. The mixture is stirred overnight and volatiles removed by distillation. The product polymer, recovered in 96% yield, is a purple solid saving a melting point greater than 300° C. The following repeating structural unit is assigned to this polymer:

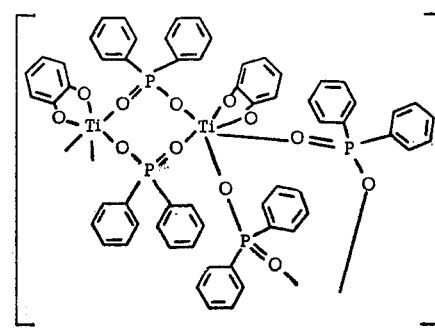

*Analysis.*—Calculated for $C_{30}H_{24}O_6P_2Ti$: C, 61.03; H, 4.10; P, 10.5; Ti, 8.11. Found: C, 60.94; H, 4.38; P, 10.57; Ti, 7.7.

EXAMPLE 2

Preparation of titanium chelate

Salicylic acid, o—$HO(C_6H_4)COOH$ (7.47 parts, 0.0541 mole) is charged with vigorous agitation to a flask containing titanium ethoxide, $Ti(OC_2H_5)_4$ (12.35 parts, 0.0541 mole), in 50 ml. of benzene under a blanket of nitrogen. The benzene and liberated by-product ethanol are removed under reduced pressure at a pot temperature of about 50° to 60° C. in about 1.5 hours. The product residue is washed with petroleum ether. A total of 14.32 g. of orange-red product is collected (97% yield) which is identified as

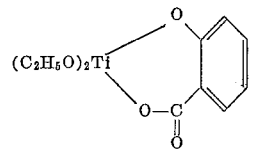

*Analysis.*—Calculated for $C_{11}H_{14}O_5Ti$: C, 48.19; H, 5.15; Ti, 17.47. Found: C, 48.54; H, 5.48; Ti, 17.35.

The product melts at about 166° C., apparently with decomposition.

Preparation of titanium phosphinate polymer

To a solution of 2.87 parts of

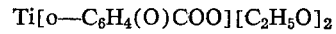

(prepared in the preceding example) in dry benzene is added 2.91 parts of $CH_3(C_6H_5)P(O)OH$. The reaction mixture is stirred for 1.5 hr. at reflux and the solvent and liberated alcohol are then removed by distillation over a period of one hour. The orange-red solid polymer product is dried in vacuo. The polymer's softening point is on the order of about 230° C.

We claim:

1. A titanium phosphinate polymer having a molecular weight within the range of about 1,500 to about 100,000 composed of the repeating unit

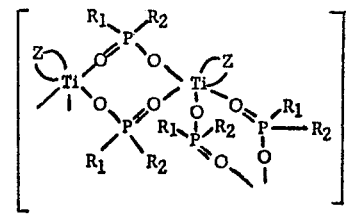

where $R_1$ and $R_2$ are radicals selected from the class consisting of:

(a) alkyl having one to ten carbon atoms;
(b) halogeno-substituted alkyl having one to ten carbon atoms wherein the halogen substituents are selected from the group consisting of fluorine, chlorine and bromine;
(c) phenyl;
(d) substituted phenyl wherein the substituents are independently selected from the group consisting of fluorine, chlorine, bromine and alkyl groups having one to eight carbon atoms, and Z is a bidentate ligand having a structure selected from the group consisting of

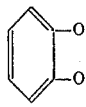 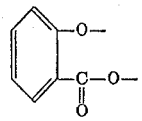 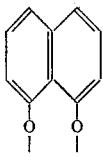

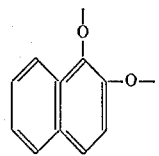 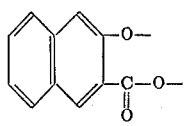 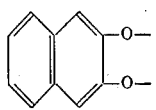

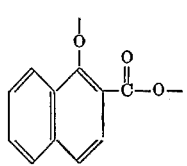 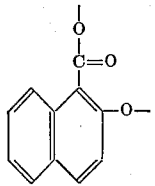

and the above structures wherein aromatic ring hydrogen atoms are replaced by substituents selected from the group consisting of alkyl having one to four carbon atoms, chlorine, fluorine and bromine.

2. A polymer according to claim 1 where Z is

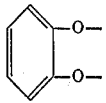

3. A polymer according to claim 2 where $R_1$ and $R_2$ are each phenyl.

4. A polymer according to claim 2 where $R_1$ is methyl and $R_2$ is phenyl.

5. A polymer according to claim 2 where $R_1$ and $R_2$ are each phenyl having chlorine substituents.

6. A polymer according to claim 2 where $R_1$ and $R_2$ are each phenyl having fluorine substituents.

7. A polymer according to claim 1 where Z is

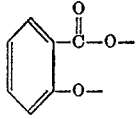

8. A polymer according to claim 7 where $R_1$ is methyl and $R_2$ is phenyl.

9. A polymer according to claim 7 where $R_1$ and $R_2$ are each phenyl.

10. A polymer according to claim 7 where $R_1$ and $R_2$ are each phenyl having chlorine substituents.

11. A polymer according to claim 7 where $R_1$ and $R_2$ are each phenyl having fluorine substituents.

References Cited

UNITED STATES PATENTS

| | | | |
|---|---|---|---|
| 3,222,298 | 12/1965 | Block et al. | 260—2 |
| 3,255,125 | 6/1966 | Block et al. | 260—2 |
| 3,275,574 | 9/1966 | Saraceno | 260—2 |

FOREIGN PATENTS 1,018,456   1/1966   Great Britain.

OTHER REFERENCES

Block et al.: J. Am. Chem. Soc. 84, 1749–50 (1962).
Block et al.: J. Am. Chem. Soc. 84, 3200–01 (1962).
Block et al.: J. Inorg. Chem. 2, 688–90 (1963).
Coates et al.: J. Chem. Soc., 1962, 2523–25.
Podall et al.: J. Polymer Sci. B1, 457–59 (1963).
Saraceno et al.: J. Inorg. Chem. 2, 864–65 (1963).
Saraceno et al.: J. Am. Chem. Soc. 85, 2018–19 (1963).

WILLIAM H. SHORT, *Primary Examiner.*

M. GOLDSTEIN, *Assistant Examiner.*

U.S. Cl. X.R.

260—429.5, 30.6, 33.6; 117—127; 106—14

UNITED STATES PATENT OFFICE
CERTIFICATE OF CORRECTION

Patent No. 3,415,781                                          December 10, 1968

Burton Peter Block et al.

It is certified that error appears in the above identified patent and that said Letters Patent are hereby corrected as shown below:

Column 2, line 70, extreme right portion of the formula reading "(RO)TiZ" should read -- $(RO)_2TiZ$ --. Column 3, lines 55 to 60, left portion of the formula reading "$[(CH_3)_2CHO_2Ti$" should read -- $[(CH_3)_2CHO]_2Ti$ --.

Signed and sealed this 10th day of March 1970.

(SEAL)
Attest:

Edward M. Fletcher, Jr.                            WILLIAM E. SCHUYLER, JR.
Attesting Officer                                                  Commissioner of Patents